April 17, 1928.

G. H. PETRI 1,666,752

FORMING MACHINE

Filed Oct. 12, 1922

Inventor
Gunther H. Petri
By Mitchell, Chadwick & Kent
Attorneys

Patented Apr. 17, 1928.

1,666,752

UNITED STATES PATENT OFFICE.

GUNTHER H. PETRI, OF BOSTON, MASSACHUSETTS.

FORMING MACHINE.

Application filed October 12, 1922. Serial No. 594,065.

This invention relates to improvements in forming machines for plastic material, more particularly for forming balls. It is especially suitable for kneading and shaping masses of dough into balls for loaves of bread, or for rolls. The invention is illustrated as it may be applied in a mechanism of the general type shown in the United States Patent No. 854,308 granted to me May 21, 1907, in which a somewhat U-shaped trough is arranged, having a stationary side and a constantly moving side, the latter being constituted by the inside face of a revolving bowl. The stationary side of the trough rises helically and spirally about a vertical stationary shaft or standard which supports it, whose axis is coincident with the axis of rotation of the bowl. The bowl has the shape of a hollow inverted cone, and is herein also referred to as a kneading table. It causes the dough to roll along the fixed side of the trough, which therefore is also herein referred to as the dough race, to the place of discharge at the top edge of the bowl. While being thus carried along, the entire lump of dough is kneaded, by the effect of the rolling coupled with such compression and drag as results from its own weight settling it into the trough, and thus is formed into a sealed ball.

The present invention has among its objects the provision of improved mechanical support and operating mechanism for such a kneading table; an improved arrangement of drive with respect thereto, so as to give better finish to the loaf; and arrangements by which dough of all commercial sizes, ranging for example from one-half ounce to sixty-four ounces or more, may be kneaded and formed in the same machine without necessity for adjustment. These objects are accomplished, so far as the mechanism is concerned, by making the cone of the table truncated and by setting up into the truncated end thereof a hollow upright cone whose upper surface forms a bottom for the conical bowl. This conical bottom cooperates both with the kneading table and trough and with the driving mechanism. As to the latter it provides an upstanding roof for an oil well, and an annular chamber for grease, through which passes the vertical standard on which the sections of dough race are supported stationarily and about which the kneading table rotates. Because of its upward projection this conical bottom affords a high location for a bearing for the revolving parts, which in combination with the low bearing for the same hereinafter described, gives the machine a remarkable stability notwithstanding the varying eccentricity of its load as lumps of dough are whirled rapidly round by it in unbalanced relation to each other. Other features which contribute to this smoothness of action are the arrangement of the driving mechanism whereby helical gears are mounted in the said oil well so as to be partly immersed therein, and the arrangement, in a grease reservoir, of the high and low bearings, the latter being a combination bearing which not only carries the weight of the rotating parts but also cooperates with the upper bearing to steady them in their rotations. The dip of the convex conical bottom toward the concave kneading table causes any ball of dough which falls on the bottom to pass downward and outward thereon, aided, if necessary, by an initial section of the dough race set over the said bottom, to bring the dough into contact with the kneading table in position to enter the open end of the trough. While the trough may have a pitch that causes it to rise uniformly, it is a feature of the present invention that a portion of it is horizontal through a distance which may vary but which as here represented is substantially a half circle, thereby providing what is herein termed a "rest" for the dough, during which it is relieved of the tearing stress which it undergoes when on those parts of the dough race which are oblique to the movement of the table. Consequently while the dough is passing this rest it acquires an augmented skin strength which leaves it with a better finish after it has traversed the rise which follows.

In addition to the provision of rests in the vertical climb of the dough to give it a better finish, there may also be provided means whereby the dough after travelling upward along one trough may return to the bottom of the table and make a second ascent along another trough arranged over the same table, from whence it will be discharged with a still better external finish and a more homogeneous internal texture. If such a fine degree of finish of the material is not required and one trough passage of the dough is sufficient, the provision for returning the balls to the bottom of the cone may be omitted; and the second trough may there be used in the same manner as the first, thus doubling the capacity of the machine, whereby either twice the number of balls of the same size may be formed, or two streams of balls, of two different sizes, may be rolled out simultaneously. It has, however, been recognized in practice that a smaller trough is best for the smaller sizes, in accordance with which, in my said patent, I provided means for making the trough adjustable. The present invention takes account of this need by providing for troughs of different dimensions, nested together within the same kneading table. Any given section of the table's area acts in cooperation with each race alternately working on masses of differing sizes in the two independent races, receiving and discharging them at different places.

Apparatus in which these features are applied is shown in the accompanying drawings, which illustrate one of the various forms in which the invention may be embodied. It is intended that the patent shall cover, by suitable expression in the appended claims, whatever features of patentable novelty exist in the invention disclosed.

Figure 3 is a plan showing a modified form of arrangement of the dough races and supports therefor; and Figure 4 is an elevation, somewhat enlarged, in section on line 4—4 of Figure 3.

Figure 1:
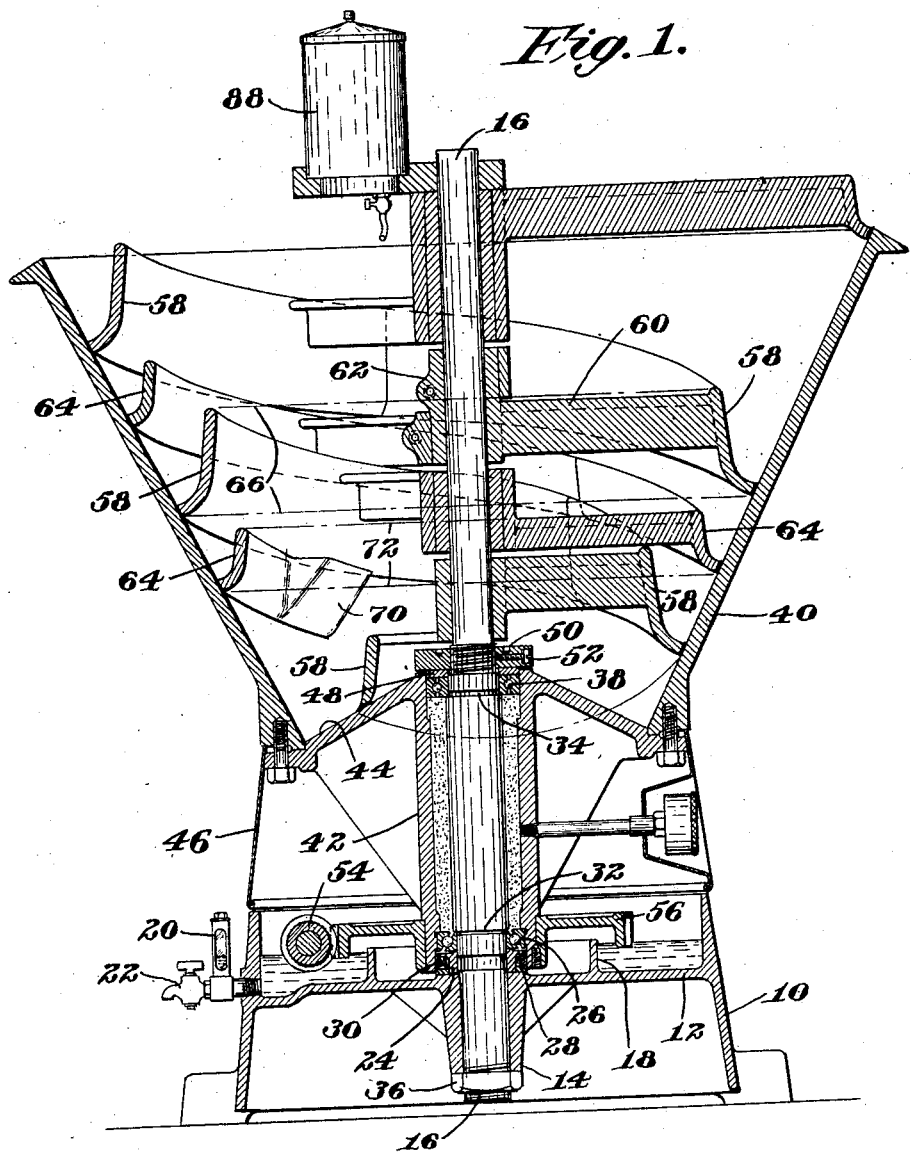
Figure 1 is a side elevation in medial section of apparatus embodying the invention.

Referring to the drawings, the machine has a hollow circular base 10, rising from a bed portion which may extend beyond the periphery of the base 10 to support a motor, bench etc., and for being rigidly secured to any suitable foundation. The hollow base 10 has a horizontal dividing and strengthening web 12 from which a hub 14 projects downward, reenforced by brace plates, to form a strong socket for a stationary shaft or standard 16 extending upward through the machine at its axis. The part of the circular wall of the base which is above the web 12 cooperates with the web as a bottom, and with an upstanding inner circular wall 18 to constitute an annular oil well or tank in which a bath of lubricating oil may be retained, its height in the tank being indicated by an oil gauge 20, and its removal being provided for by a valve cock 22. Surrounding the stationary shaft 16 close above the hub 14 is a flanged collar 24 upon whose flange rests the cup member of an anti-friction combination step and journal ball bearing 26. About this collar, between its flange and a retaining washer 28 under it, a suitable packing or gasket ring 30 is provided to prevent leakage of grease. The diameter of the standard 16 is slightly increased for a portion above the bearing 26, thereby forming a downward facing shoulder 32 and an upward facing shoulder 34, the former of which rests on the cup of the bearing 26. The shaft is securely fastened in the socket 14 by tightening a nut 36 threaded on its lower end against the lower end of the socket, the shoulder 32, the cup of the bearing 26 and the collar being thus all drawn down tight against the upper end of the socket.

The ball bearing 26, together with a ball bearing 38 resting on the upper shoulder 34 of the shaft, forms the journal of a rotating member comprising three portions, viz an upper portion which constitutes a kneading bowl or table 40, being an inverted truncated hollow cone; a lower portion which constitutes a cylindrical sleeve 42 of small diameter, encasing the standard, and engaging the ball bearings; and an intermediate portion 44, which is conical, upright, and is projected up into the truncated lower end of the upper portion 40 so as to close the opening at its bottom. A protective sheet metal thin shell 46 may depend from the place where the intermediate and upper rotating portions are joined, covering the space down to the upper edge of the base 10. The space between the sleeve 42 and the shaft or standard 16 constitutes an annular chamber for grease fed through a tube passing through the apron 46; and since the bearings 26 and 38 make the ends of this annular grease chamber they are effectively lubricated. The upper ball bearing is held in place against the shoulder 34 by a washer 48, nicely fitted between the shaft 16 and hub 42 to prevent escape of the grease from the annular chamber, and a nut 50 threaded on the standard and locked thereto by a set screw 52. Web plates at intervals about the exterior of the sleeve brace the rotating table and make the structure rigid. The table is rotated by a horizontal shaft, suitably journaled in the base, having the helical gear or worm 54 in mesh with a helical gear 56 fast on the hub 42 at its lower end. The teeth of this worm and gear are partly submerged in the oil contained in the well. In the embodiment illustrated, the plane in which bearing 26 lies passes horizontally through the worm and gear at their medial point of contact. The radial component of the thrust of the gear 56 therefore is borne directly upon the bearing. The upward component of the thrust of worm teeth at the pitch of the hub gear is very effectively carried by the upper bearing because the high conical bottom permits the setting of that bearing high where it is in position both to withstand eccentric loading of the whirling table and said upward thrust which tends to tip over the barrel support of the table.

Figure 2:
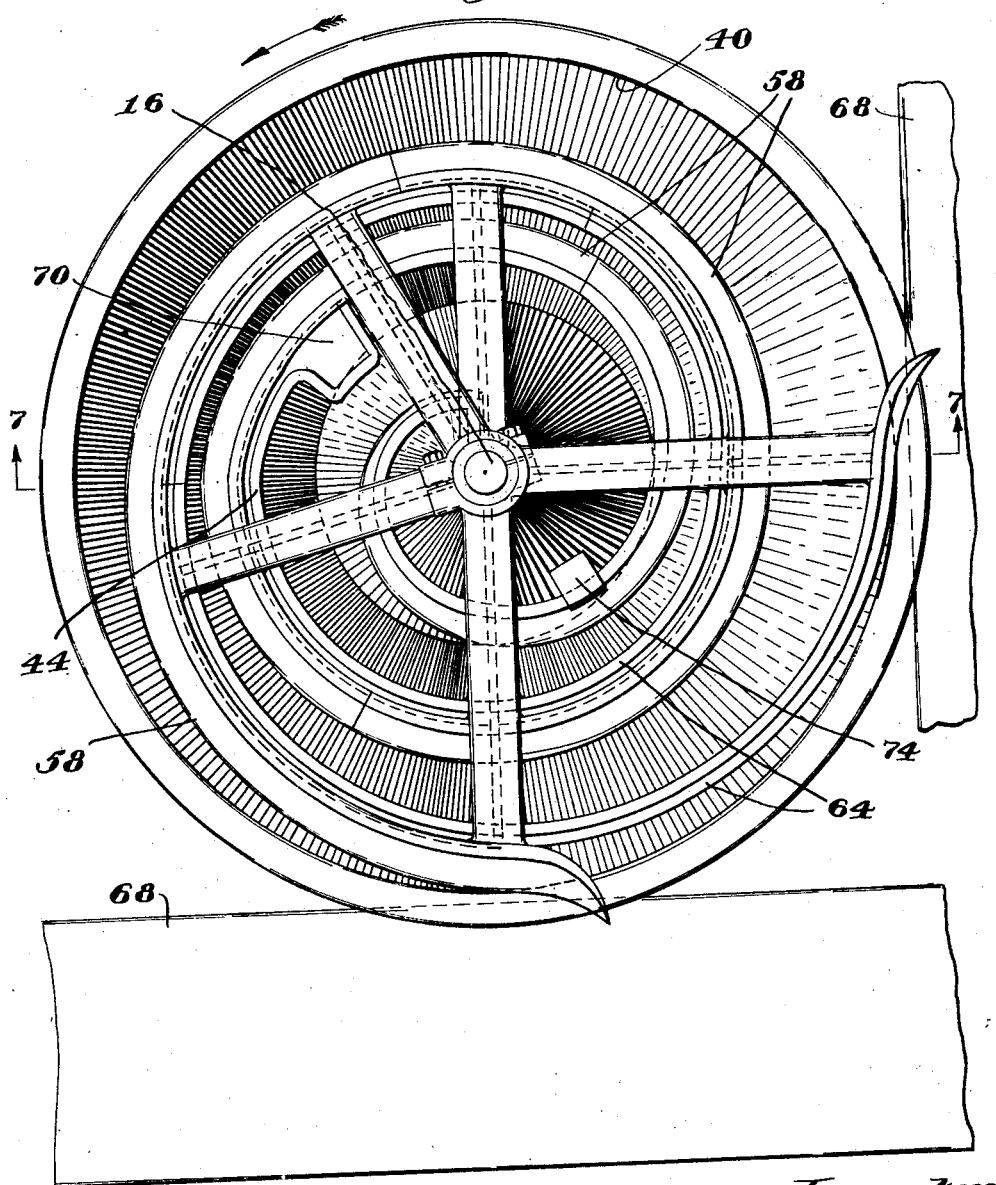
Figure 2 is a plan of the same.

A dough race 58 is coiled spirally upward and around the standard 16 to form (in conjunction with the inclined face of the revolving bowl or table 40) a trough along which the mass of dough rolls as it travels from the bottom of the bowl to its top edge. This race is preferably made in successive sections, each supported by one or more horizontal arms 60 projecting radially from split hubs 62 adjustable in height on the stationary shaft 16. By these the lower edge of the race may be set close to the table. It is a feature of the invention that one revolving table serves a plurality of dough races, simultaneously, each bit of its surface coacting with them alternately. As illustrated in Figs. 1, and 2, one of these 58 is for bread loaves, or, say, for all sizes above four ounces, and the other 64 is for buns, or, say, for sizes under four ounces. The dough race 58 begins close to the shaft 16 and winds spirally outward. It first goes downward over the surface of the conical bottom 44 until its bottom edge all but touches the side wall of the table. As its radial distance from the shaft increases it rises along the surface of the table, i. e., the interior of the bowl, with its bottom edge close thereto, cooperating with the table to form a trough. At a place midway of its climb, the race may be horizontal for about half of its revolution, thus providing a rest for the dough from the stresses it undergoes under the oblique forces acting upon it on the climb. In Figure 1 such a rest is illustrated by the dash and dot lines 66, inasmuch as the horizontal portion of the trough is by the sectioning cut away in the drawing. This rest enables the dough, as its rolls along horizontally, to be kneaded without quite so much strain as is imposed upon it elsewhere, and thus serves to strengthen the surface and texture which the ball has on discharge at the top of the bowl, where the ball is rolled upon a stand or a conveyor 68 as indicated in Figure 2.

The smaller dough race 64 is supported in the same manner as the larger, its arms having split hubs adapted to be clamped over the hubs of the arms of the larger race. Inasmuch as the masses of dough to be kneaded in the trough formed by the small race and the table are of smaller diameter they may be given the requisite revolutions in a shorter length of trough. It is therefore desirable to feed them into their trough at a point part way up the side of the bowl. To do this a chute 70 at the entrance end of the small trough is positioned above the bottom of the table, thereby shortening the path of the small balls. The small balls may be guided to this chute from the top of the machine by a vertical trough (not shown). In this race, like the other, a portion may be made horizontal, to provide a rest for the dough. Such a portion is illustrated by the dot and dash lines 72.

The invention also provides a very substantial saving in the cost of kneading bread by eliminating the dusting of the dough race and table with flour. Hitherto balling machines have required frequent application of flour to prevent the dough from adhering to the surfaces with which it comes in contact, as any sticking of the dough thereto tears the mass. It is advantageous, however, to provide means for lubricating that portion of the race where the dough is weakest and the stress upon it greatest. One possible method of lubrication is shown, whereby a can 88, having a valve and pipe, (Figure 1) is arranged to drip vegetable oil upon a spatter plate 74 (Figure 2) attached at an angle to the upper edge of the larger dough race at the portion of greatest climb, so that the oil spreads and lubricates the surface of the race where it is wanted.

In Figures 3 and 4, there is shown a different arrangement of supporting arms, and in addition means whereby a ball after rolling upward along one trough, may be returned to the bottom of the table to begin a climb up another trough. Their supporting arms 60' in this modification are placed at right angles to each other about the vertical standard 16, to form four equal spaces between them in the hollow of the table. This arrangement enables the machine to accommodate delivery conveyers that may come from various directions as may be most convenient, in the shop, so as either to introduce the unmolded mass into one portion of the kneading table or into a portion substantially ninety degrees away. As compared with the arrangement shown in Figures 1 and 2, this is preferable because the adjustment of the bottom edges of the races with respect to the surface of the table is a rather delicate operation. The open spaces of Figs. 3 and 4 provide for insertion of a chute for receiving the dough masses in any one of the four spaces, thus providing for cooperation with belts running to the machine from any direction, without changing the delivery ends of the races.

The provision for returning the dough from the upper end of one trough 58' to the bottom of the table comprises a chute 74 attachable to the end of one race into which chute the ball rolls and by which it is directed in its drop to that portion of the table bottom ahead of the entrance end of the other trough 58 so that it will thereafter enter the second trough 58 and make another trip up the table, at the end of which it will be discharged from the machine. The sudden and rapid drop of the ball also aids in the kneading of it, being comparable to the slapping or dropping of dough on a kneading table by a hand kneader. Preferably this chute starts with a deflecting plate 76 against which balls impinge at the end of their rise which turns them inward far enough for the ball to get on the steeply descending part of the chute. As represented the latter turns somewhat backward to its destination but if this is found to retard the balls too much at its entrance it can be otherwise arranged. If it is not desired to have the dough traverse the two troughs successively, the chute may be removed from the end of the trough from which it is separable at the division line 78 indicated and a section substituted which will guide the ball out from the machine at the end of its first climb. Thus used, the machine can handle twice the quantity of material as when the upward travel of the ball is repeated; or, as heretofore described, a race of smaller dimensions may be attached and balls of different sizes formed simultaneously.

It will be understood that in the use of language to describe the structure of the invention the word "conical" as applied to the table or bowl is used in a general sense as its elements are not necessarily straight lines, although experiences thus far has indicated that straight line elements are preferable.

Also it is most convenient to refer to the member 58 as a dough race, and to speak of it as being "concave toward" the table; although in a sense the dough is held by the trough which is composed by the cooperation of this member with a portion of the table surface. The member 58 is concave toward the table in this general sense of cooperating therewith to form a concavity which holds the dough ball, on that side of the stationary member which faces toward the table. But it will be understood that this member 58 is essentially a moulding board, and that, as has long been known in the baker's art, it is not necessarily of itself concave as illustrated, but other surfaces may be substituted, as, for example, a dough engaging barrier having straight line elements, or one consisting of a rib with convex surface. The claims are to be understood in this sense.

I claim as my invention:

1. A forming machine for plastic material comprising a rotatable conical molding table; a vertical standard extending upward therein; dough races of different sizes supported on said standard, extending spirally over said table, adapted to engage different sized masses of plastic material, whereby the table works on different sizes simultaneously; and means for rotating said table about said standard in a direction crossing the races.

2. A forming machine for plastic masses comprising a conical molding table combined with a race whose course is partly spiral and partly circular, extending over the table, one of said elements being rotatory, thereby to roll a mass engaged between them.

3. A forming machine for plastic masses comprising a conical molding table mounted on a vertical axis, combined with a race extending over the table and along the axis; one of said elements being rotatory thereby to roll a mass engaged between them; the said race having climbing portions alternating with a horizontal portion.

4. A forming machine for plastic masses comprising a conical molding table, a plurality of races extending thereover said races being shaped and supported in relation thereto so that separate races are adapted to work different sized masses and means for producing relative motion between said table and races, the races being arranged in succession along the direction of rotation, whereby different sizes are worked simultaneously on the single table.

5. A forming machine for plastic materials comprising a conical molding table combined with a plurality of spiral races extending thereover and means for producing relative rotation between said table and said races; the races being set in alternation around the direction of rotation, whereby the single table works simultaneously on material in separate races.

Signed at Boston, Massachusetts, this second day of March, 1921.

GUNTHER H. PETRI.